(12) United States Patent
Ahn

(10) Patent No.: US 8,512,889 B1
(45) Date of Patent: Aug. 20, 2013

(54) BATTERY MODULE

(75) Inventor: Jang-Gun Ahn, Yongin-si (KR)

(73) Assignees: Samsung SDI Co., Ltd., Suwon-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/556,622

(22) Filed: Jul. 24, 2012

Related U.S. Application Data (60) Provisional application No. 61/603,582, filed on Feb. 27, 2012.

(51) Int. Cl.
 *H01M 2/10* (2006.01)
(52) U.S. Cl.
 USPC .............................................. 429/99; 429/96
(58) Field of Classification Search
 None
 See application file for complete search history.

(56) References Cited

U.S. PATENT DOCUMENTS

| | | | |
|---|---|---|---|
| 6,455,190 B1 * | 9/2002 | Inoue et al. | 429/160 |
| 6,761,992 B1 * | 7/2004 | Marukawa et al. | 429/96 |
| 2004/0043287 A1 * | 3/2004 | Bando et al. | 429/156 |
| 2005/0100783 A1 * | 5/2005 | Ro et al. | 429/159 |
| 2008/0118819 A1 * | 5/2008 | Gamboa et al. | 429/61 |
| 2010/0190055 A1 * | 7/2010 | Khakhalev | 429/211 |
| 2010/0255363 A1 | 10/2010 | Yoon et al. | |
| 2010/0273042 A1 | 10/2010 | Buck et al. | |
| 2011/0039130 A1 * | 2/2011 | Baek et al. | 429/7 |

FOREIGN PATENT DOCUMENTS

| | | |
|---|---|---|
| KR | 10-2007-0081584 A | 8/2007 |
| KR | 10-2010-0095457 A | 8/2010 |

\* cited by examiner

*Primary Examiner* — Patrick Ryan
*Assistant Examiner* — Jose Colucci Rios
(74) *Attorney, Agent, or Firm* — Lee & Morse, P.C.

(57) ABSTRACT

A battery module includes a plurality of battery cells, a support plate adjacent to sides of the plurality of battery cells and the support plate includes an opening, and a first end plate that is adjacent to the support plate. The first end plate includes a projection that engages with the opening to couple together the first end plate and the support plate.

20 Claims, 7 Drawing Sheets

BATTERY MODULE

CROSS-REFERENCE TO RELATED APPLICATION

The present application claims priority under 35 U.S.C. §119(e) to U.S. Provisional Application No. 61/603,582, filed on Feb. 27, 2012, and entitled: "Battery Module," which is incorporated herein by reference in its entirety.

BACKGROUND

High-power battery modules using multiple battery cells are being developed. The battery cells may include, e.g., a non-aqueous electrolyte with high energy density. A large-capacity battery module may be configured by connecting a plurality of battery cells in series. For example, the battery modules may be used in driving motors of devices requiring high power, e.g., electric vehicles and the like.

As devices using battery modules have various external appearances, shapes of the battery modules may be varied to correspond with the external appearances. Further, the demand for light and small-sized battery modules has increased. In addition, since safety is a concern with respect to battery modules, studies on the structures of the battery modules have been conducted in many fields so as to satisfy these requirements.

SUMMARY

Embodiments may be realized by providing a battery module including a plurality of battery cells, a support plate adjacent to sides of the plurality of battery cells, the support plate including an opening, and a first end plate that is adjacent to the support plate. The first end plate may include a projection that engages with the opening to couple together the first end plate and the support plate.

The opening may expose at least one of the plurality of battery cells. The first end plate may be affixed to the support plate with only an opening projection connection between the opening and the projection. The opening-projection connection may be free of any separate fastening member.

The projection may be a bent portion of the first end plate. A lateral end of the projection may be in a non-overlapping relationship with the plurality of battery cells. The projection may include an extending portion that extends through the opening, and a bending portion that is bent from the extending portion. The lateral end of the projection may be on the bending portion. A length of the extending portion may be substantially equal to a thickness of the support plate.

The bending portion may be adjacent to an outer surface of the support plate. An inner surface of the support plate may be adjacent to the sides of the plurality of battery cells. The bending portion may include a protrusion that corresponds to an indentation on the outer surface of the support plate.

The battery module may include a second end plate. The first end plate may be adjacent to a first region of the support plate and the second end plate may be adjacent to a second region of the support plate. The second region may oppose the first region. The second end plate may be fastened to the second region of the support plate. The first end plate may be affixed adjacent to the first region of the support plate without being fastened with any separate fastening member.

The first end plate may have a first configuration that includes the projection and the second end plate may have a second configuration. The first configuration may be different from the second configuration.

The opening may include a plurality of openings in the support plate. The projection may include a plurality of projections. The plurality of projections may be spaced apart from each other and may be coupled to the plurality of openings.

The plurality of openings in the support plate may be spaced apart from each other, each opening may receive one of the plurality of projections extending thereto, and the one of the plurality of projections may be in contact with a sidewall of the opening.

The first end plate may include a base portion that is substantially parallel to wide faces of the plurality of battery cells. The projection may be integrally formed as one continuous piece bent from the base portion. The projection may be seated on a first region of the support plate. The first region of the support plate may be adjacent to the first end plate.

The support plate may be one of a plurality of support plates arranged adjacent to different sides of the plurality of battery cells. The opening may be one of a plurality of openings in the support plates. The projection may be one of a plurality of projections extending from a base portion of the first end plate. Each projection may extend through one of the openings.

Inner surfaces of the plurality of support plates may face the plurality of battery cells. The plurality of projections may be seated on outer surfaces of the support plates. The projections may be in contact with sidewalls of the plurality of openings. The support plate may be one of a plurality of support plates arranged adjacent to different sides of the plurality of battery cells. The plurality of support plates may be one continuous piece.

The support plate may include a frame end portion. A first surface of the frame end portion may be adjacent to the first end plate and a second surface of the frame end portion may oppose the first surface. The projection may be in contact with the second surface. The support plate may include a frame end portion that defines an outermost side of the support plate and that defines a sidewall of the opening. The frame end portion may be in a non-overlapping relationship with the plurality of battery cells. The projection may be in contact with the frame end portion and the sidewall of the opening.

Embodiments may also be realized by providing a battery module that includes a plurality of battery cells arranged in one direction, first and second end plates respectively disposed at outsides of the battery cells, and one or more support plates coupled to the first and second end plates. One and the other ends of the support plate are respectively coupled to the first and second end plates, and at least one of the support plates is coupled to at least one of the first and second end plates by a groove-projection connection.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

The drawings and description are to be regarded as illustrative in nature and not restrictive. In the drawing figures, the dimensions of layers and regions may be exaggerated for clarity of illustration. Like reference numerals refer to like elements throughout.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Also, when an element is referred to as being "coupled to" another element, it can be directly coupled to the element or be indirectly coupled to the element with one or more intervening elements interposed therebetween.

Figure 1:
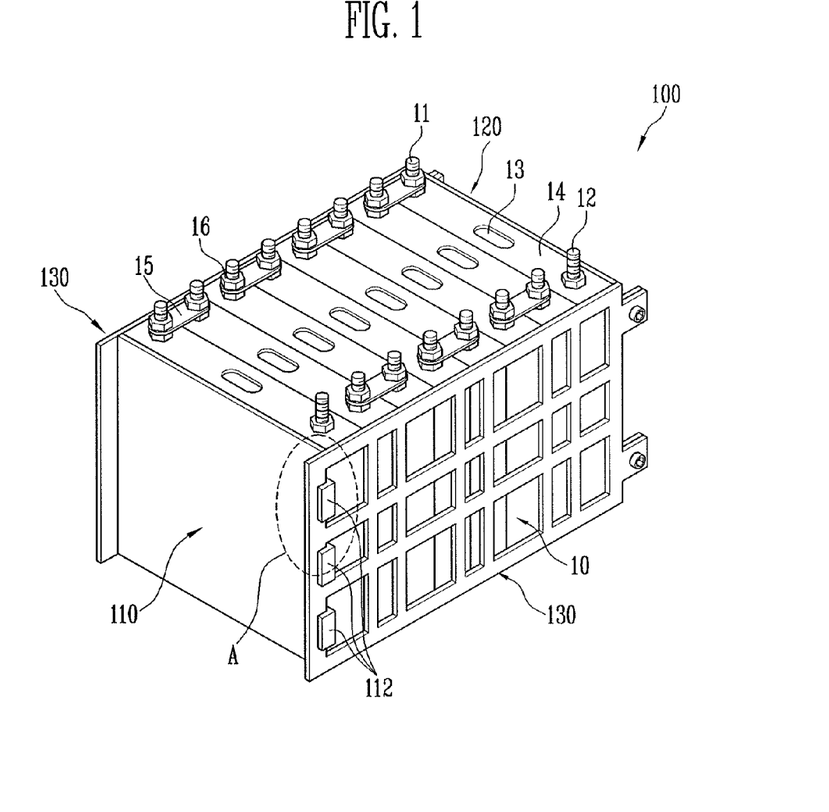
FIG. 1 illustrates a perspective view of a battery module according to an exemplary embodiment.
Figure 2:
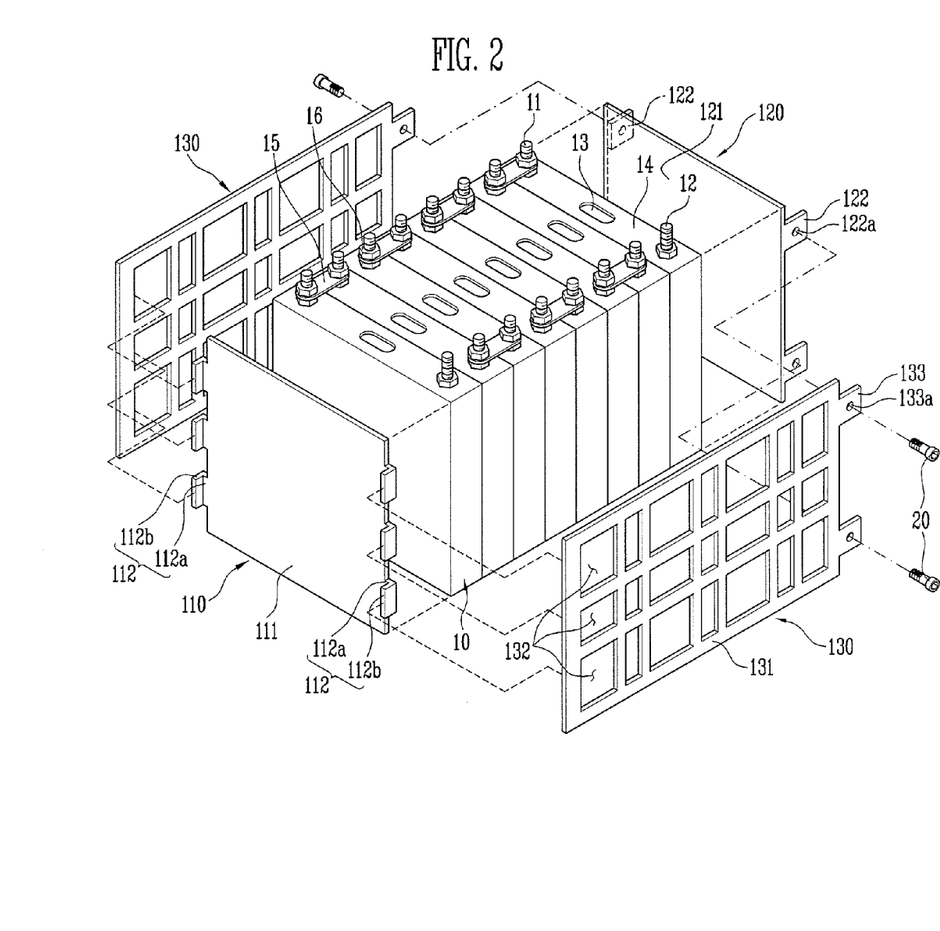
FIG. 2 illustrates an exploded perspective view of the battery module shown in FIG. 1.

FIG. 1 illustrates a perspective view of a battery module according to an exemplary embodiment. FIG. 2 illustrates an exploded perspective view of the battery module shown in FIG. 1.

The battery module 100 according to this embodiment includes a plurality of battery cells 10 arranged in one direction, e.g., the battery cells 10 may be arranged in parallel to each other. First and second end plates 110 and 120 may be disposed at outsides, e.g., opposing ends, of the plurality of battery cells 10. One or more support plates 130 may be coupled to the first and second end plates 110 and 120. One and the other ends of the support plate 130 may be respectively coupled to the first and second end plates 110 and 120. For example, opposing ends of each support plate 130 may be connected to the first and second end plates 110 and 120, respectively.

At least one support plate 130 may be coupled to at least one of the first and second end plates 110 and 120 by a groove-projection connection. For example, at least one of the first and second end plates 110 and 120 may be affixed to at least one of the support plates 130 with an opening-projection connection. Referring to FIG. 2, the first end plate 110 may be affixed to two separate support plates 130 by way of openings, e.g., a third coupling portion 132, in the support plates 130 and projections, e.g., a first coupling portion 112, extending from the first end plate 110.

The battery cell 10 may include a battery case having one opened surface, and an electrode assembly and an electrolyte, accommodated in the battery case. The electrode assembly and the electrolyte may generate energy through an electrochemical reaction. The battery case may be sealed, e.g., the one opening surface of the battery case, by a first surface 14 of the battery cell 10. For example, the first surface 14 of the battery cell 10 may include a cap assembly. The first surface may be provided with positive and negative electrode terminals 11 and 12 having different polarities, and a vent portion 13. The vent portion 13 is, e.g., a safety means of the battery cell 10. The vent portion 130 act as a path through which gas generated in the inside of the battery cell 10 may be exhausted to an outside of the battery cell 10. Adjacent battery cells 10 may be electrically connected through a bus-bar 15. The bus-bar 15 may be fixed to the positive and negative electrode terminals 11 and 12 by, e.g., a nut 16 or the like.

The battery module 100 may include the first and second end plates 110 and 120 and the support plates 130. The first end plate 110, the second end plate 120, and the support plates 130 may together fix the plurality of battery cells 10 in the one direction, e.g., all of the plurality of battery cells 10 may be provided between the first and second end plates 110 and 120 and the support plates 130 may be adjacent to lateral side surfaces of all of the plurality of battery cells 10. The first and second end plates 110 and 120 may be provided to face wide surfaces of the outermost battery cells 10, respectively, of the plurality of battery cells 10. The first and second end plates 110 and 120 may press the battery cells 10 in the inside direction of the battery cells 10, and the support plates 130 may fix sides of the battery cells 10.

First and second ends of the support plate 130 are respectively coupled to the first and second end plates 110 and 120. At least one of the support plates 130 may be coupled to at least one of the first and second end plates 110 and 120 by the groove-projection connection, e.g., an opening in the support plate 130 may have a projection member from one of the first and second end plates 110 and 120 extending therethrough to form an opening-projection connection therebetween.

For example, in the case that the first end plate 110 forms an opening-projection connection with at least two support plates 130, the first end plate 110 may include first coupling portions 112 and the second end plate 120 may include second coupling portions 122. The first coupling portions 112 may have a different shape and a different structure from the second coupling portions 122. Third and fourth coupling portions 132 and 133 may be provided at opposing ends of the support plate 130, respectively. The third and fourth coupling portions 132 and 133 may be formed to accommodate the shapes and structures of the first coupling portions 112 and the second coupling portions 122, respectively. Accordingly, the third and fourth coupling portions 132 and 133 may be coupled to the first and second coupling portions 112 and 122, respectively.

Referring to FIG. 2, the third coupling portion 132 may be at least one opening, e.g., a through hole, in the support plate 130. The opening in the support plate 130 may expose at least one of the plurality of battery cells 10. For example the third coupling portion 132 may expose a lateral side of a battery cell 10 that is adjacent to the first end plate 110. The third coupling portion 132 may also expose a portion of a lateral side of the first end plate 110. The support plate 130 may include other openings that expose lateral sides of the plurality of battery cells 10. The other openings are different from the third coupling portion 132 because the other openings, e.g., exclude opening-projection connections with at least one of the first and second end plates 110 and 120.

The fourth coupling portion 133 may be a projection extending from the support plates 130. The fourth coupling portion 133 may be used for affixing, e.g., by using a fastening member, the second plate 120 to the support plate 130. For example, the fourth coupling portion 133 may include a through hole 133a for accommodating a separate fastening member 20 such as a fastening bolt to extend therethrough. The separate fastening member 20 may also extend through a through hole 122a, which is in the corresponding second coupling portion 122. The fourth coupling portion 133 may be in a non-overlapping relationship with the plurality of battery cells 10, e.g., the through hole 133a may not expose any of the plurality of battery cells 10. Accordingly, the second coupling portion 122 and the fourth coupling portion 133 may be affixed using a different arrangement than that used for fixing the first coupling portion 112 and the third coupling portion 132.

According to an exemplary embodiment, the first and third coupling portions 112 and 132 may be coupled to each other by the groove-projection connection. As such in the exemplary embodiment, the first coupling portion 112 may be a projection extending from the first end plate 110 and the third coupling portion 132 may be an opening to form the opening-projection connection to couple together the first end plate 110 and the support plate 130.

The first and second end plates 110 and 120 may include first and second base portions 111 and 121, respectively, which face the battery cells 10. According to an exemplary embodiment, the first coupling portion 112 may be provided on the first base portion 111, e.g., as a projection having a first width that extends from the first base portion 111 having a second width that is greater than the first width. The second coupling portions 122 may be provided on the second base portion 121, e.g., as an extending member having a third width that extends from the second base portion 121 having a fourth width that is greater than the third width. The first and second coupling portions 112 and 122 may be provided on a plurality of sides, e.g., both left and right sides, of the first and second base portions 111 and 121, respectively.

Figure 3:
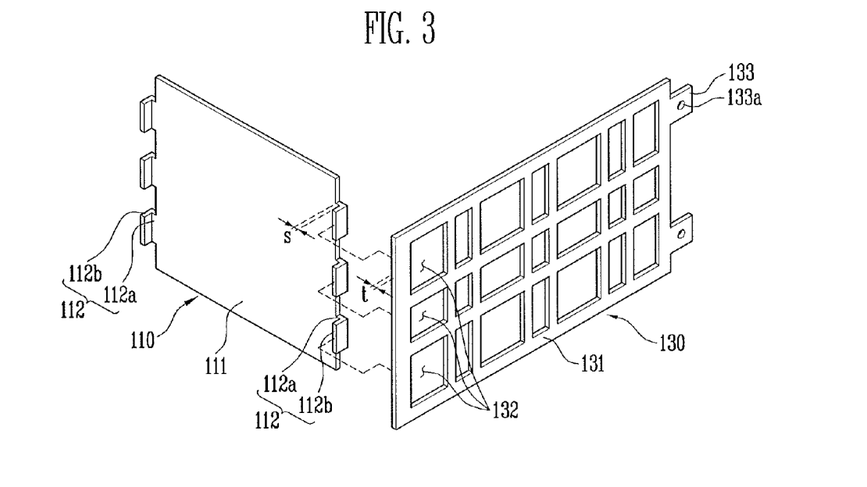
FIG. 3 illustrates a perspective view showing a first end plate and a support plate of FIG. 1.
Figure 4:
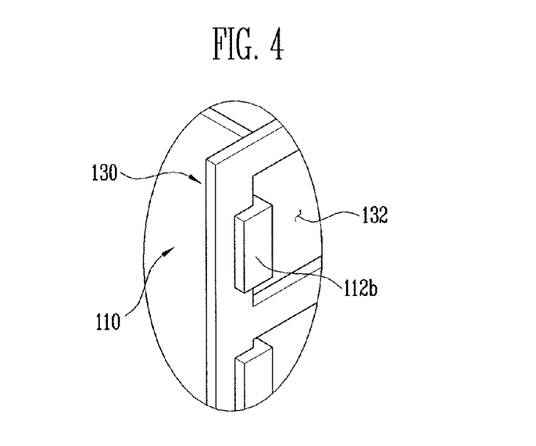
FIG. 4 illustrates an enlarged view showing portion A of FIG. 1.

FIG. 3 illustrates a perspective view showing the first end plate 110 and the support plate 130 of FIG. 1. FIG. 4 illustrates an enlarged view showing portion A of FIG. 1.

Referring to FIGS. 3 and 4, the support plate 130 may include a substantially rectangular planar member 131 overlapping, e.g., supporting, the sides of the battery cells 10. The third and fourth coupling portions 132 and 133 may be provided at opposing ends of the planar member 131. The third coupling portion 132 may include one or more openings provided at one end of the planar member 131. The fourth coupling portions 133 may include one or more extending members extending from the opposing ends of the planar member 131. The planar member 131 may include a frame end portion that defines an outermost side of the support plate 130 and that defines one sidewall of the third coupling portion 132. A first surface of the frame end portion of the planar member 131 may be adjacent to the first end plate 110. A second surface of the frame end portion of the planar member 131, which second surface opposes the first surface, may be in contact with the first coupling portion 131. The first coupling portion 131 may also be in contact with the sidewall of the third coupling portion 132 that is defined by the frame end portion. The frame end portion of the planar member 131 may be in a non-overlapping relationship with the plurality of battery cells 10.

In a battery module, various types of members may be used to fix the alignment state of a plurality of battery cells. However, the battery cells may have smooth surfaces, which may make it difficult to handle the battery cells. As the number of the battery cells increases, a complicated process may be required to fix the battery cells, which increases the processing time and results in a decrease in productivity. A battery module having improved productivity may be realized by facilitating the coupling between the first and second end plates and the support plates. For example, a separate coupling member may be omitted, and thus it may be possible to reduce the possibility of and/or prevent a failure from occurring when the coupling member is omitted in a process.

The first coupling portion 112 may include a plurality of first coupling portions 112. Each of the first coupling portions 112 of the first end plate 110 may include an extending portion 112a and a bending portion 112b. The extending portions 112a may extend in a first direction that is substantially parallel to the first base portion 111. A plurality of extending portions 112a may be formed on opposing sides of the first base portion 111. The bending portions 112b may be bent in a second direction that intersects the first direction, e.g., in the opposite direction of the battery cells 10 (see FIG. 1) from the extending portion 112a. For example, each of the bending portions 112b may be substantially perpendicular to corresponding ones of the extending portions 112a.

The first base portion 111, the extending portion 112a, and the bending portion 112b may be integrally formed as one continuous piece or may be assembled together. The bending portion 112b may extend directly from the extending portion 112a. The length "s" of the extending portion 112a may be provided to correspond to the thickness "t" of the support plate 130. Accordingly, the extending portion 112a may extend through the third coupling portion 132, e.g., the extending portion 112a may be in direct contact with sidewalls of the third coupling portion 132. The bending portion 112b may be adjacent to an outer surface of the support plate 130, e.g., may be directly on the outer surface of the support plate 130. The outer surface of the support plate 130 may be opposite an inner surface of the support plate 130 that is adjacent to the sides of the plurality of battery cells 10.

The first end plate 110 and the support plate 130 may be coupled to each other by the first and third coupling portions 112 and 132. In this case, a separate coupling member such as a fastening member that is one of a bolt or stud may not be required. For example, an opening-projection connection between the first and third coupling portions 112 and 132 may be free of any separate fastening member. The support plates 130 may be respectively provided at different sides, e.g., opposing sides, of the first end plate 110, and the first coupling portion 112 may pass through the third coupling portion 132. Accordingly, the first end plate 110 and the support plate 130 may be easily arranged with each other, e.g., affixed to each other using an interlocking relationship without any separate fastening member. Subsequently, the first and third coupling portions 112 and 132 may be overlapped with each other by moving the first end plate 110 in the outside direction of the battery cells 10. Thus, the first end plate 110 and the support plate 130 may be coupled to each other at an exact position without using a separate coupling member.

The length "s" of the extending portion 112a in the first coupling portion 112 may be provided to correspond to the thickness "t" of the support plate 130. That is, the extending portion 112a and the bending portion 112b in the first coupling portion 112 may be provided to surround the third coupling portion 132, so as to fix the third coupling portion 132. Thus, the coupling performance between the first end plate 110 and the support plate 130 may be improved. According to an exemplary embodiment, a predetermined space may be first provided by coupling the first end plate 110 and the support plate 130, and the plurality of battery cells may be arranged in the predetermined space.

Figure 5:
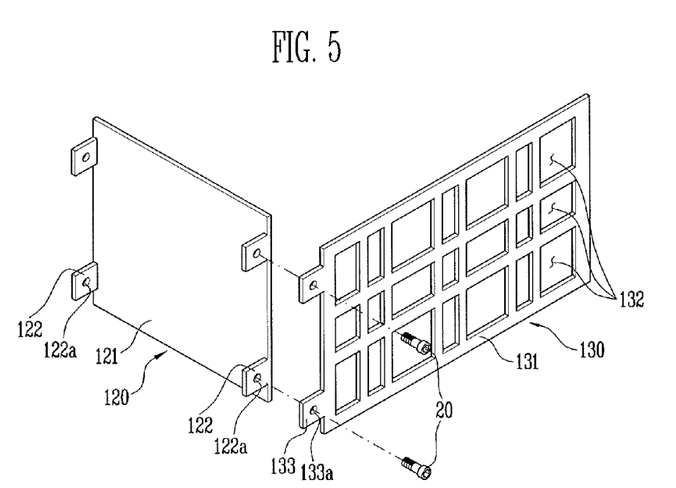
FIG. 5 illustrates a perspective view showing a second end plate and the support plate of FIG. 1.

FIG. 5 illustrates a perspective view showing the second end plate 120 and the support plate 130 of FIG. 1.

The support plate 130 may include the third and fourth coupling portions 132 and 133 respectively provided at opposing ends of the planar member 131. The fourth coupling portion 132 may include one or more projection portions extended from the other end of the planar member 131, e.g., a width of the projection portions may be less than a width of the planar member 131. The second end plate 120 may include the second coupling portions 122 bent to be extended in the opposite direction of the battery cells 10 (see FIG. 1) from the second base portion 121. The second coupling portions 122 may be in a non-overlapping relationship with the battery cells 10. The second and fourth coupling portions 122 and 133 may include the through-holes 122a and 133a, respectively, provided to correspond to each other. Each of the second coupling portions 122 may correspond to one of the fourth coupling portions 133.

The sizes of the first and second base portions 111 and 121, respectively, provided to the first and second end plates 110 and 120 may be provided to correspond to each other. The size, e.g., a length and a width, of the first and second base portions 111 and 121 may correspond to a side, e.g., a length and a width, of the wide surface of the battery cells 10.

According to an exemplary embodiment, the first end plate 110 and the support plate 130 may first be fixed to each other, e.g., using the opening-projection connection. Then, the plurality of battery cells may be pressed in the inside direction thereof in the state in which the plurality of battery cells 10 are arranged. Thereafter, the second end plate 120 and the support plate 130 may be coupled to each other, e.g., using a fastening member such as the separate fastening member 20. That is, the second coupling portion 122 of the second end plate 120 may be overlapped with the fourth coupling portion 133 of the support plate 130, and the corresponding through-holes 122a and 133a respectively provided to the second and fourth coupling portions 122 and 133, respective, may be aligned with each other. The through-holes 122a and 133a may be coupled by passing the separate fastening member 20 therethrough. Accordingly, the plurality of battery cells 10 may be firmly fixed to form a battery module. For example, the fastening member 20 may be a bolt or a stud.

Hereinafter, other embodiments will be described with reference to FIGS. 6 to 9. Contents of these embodiments, except the following content, are similar to those of the embodiment described in FIGS. 1 to 5, and therefore, repeated detailed descriptions will be omitted.

Figure 6:
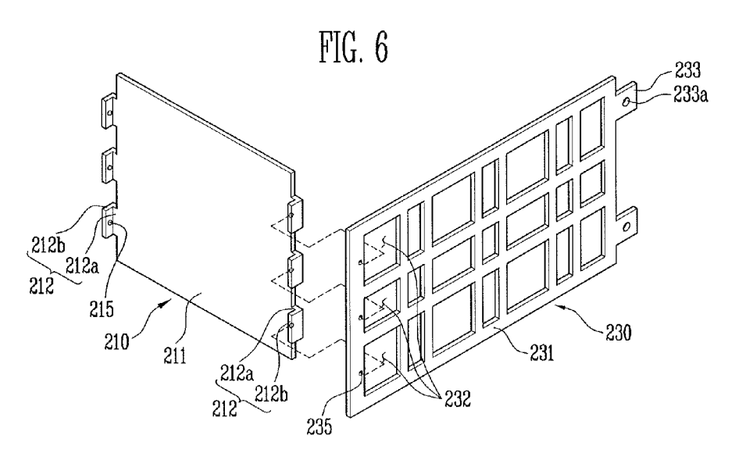
FIG. 6 illustrates a perspective view showing a first end plate and a support plate according to an exemplary embodiment.
Figure 7A:
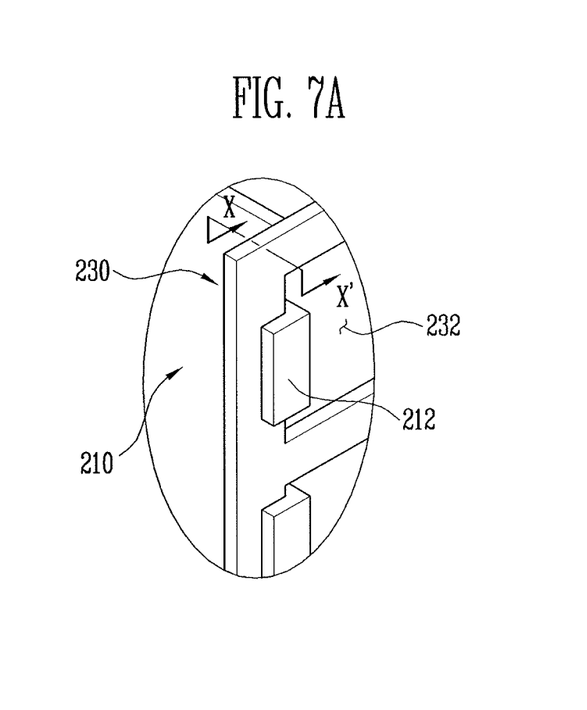
FIG. 7A illustrates an enlarged view showing first and third coupling members of FIG. 6.
Figure 7B:
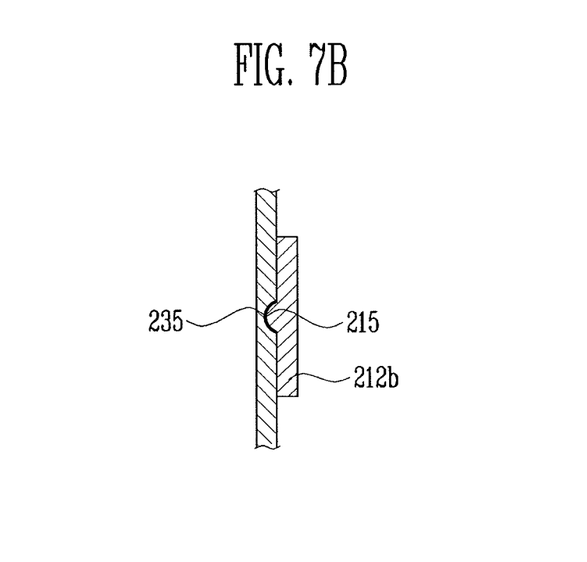
FIG. 7B illustrates a sectional view taken along line X-X' of FIG. 7A.

FIG. 6 illustrates a perspective view showing a first end plate 210 and a support plate 230 according to another exemplary embodiment. FIG. 7A illustrates an enlarged view showing first and third coupling portions 210 and 232. FIG. 7B illustrates a sectional view taken along line X-X' of FIG. 7A.

Referring to FIGS. 6 to 7B, in the battery module according to this exemplary embodiment, one end of a support plate 230 may be coupled to a first end plate 210 by a groove-projection connection, e.g., an opening-projection connection. The first end plate 210 may include a first base portion 211 and at least one first coupling portion 212. The at least one first coupling portion 212 may be provided extending from sides, e.g., opposing sides, of the first base portion 211. At least one third coupling portion 232 in the support plate 230 may be provided to correspond to the first coupling portions 212, e.g., a plurality of the third coupling portions 231 may be provided at one end of the support plate 230.

Each of the first coupling portions 212 may include an extending portion 212a and a bending portion 212b. When the first and third coupling portions 212 and 232 are coupled to each other, the extending portion 212a and the bending portion 212b may be overlapped with each other so as to correspond to the shape of the third coupling portion 232. The bending portion 212b may be seated on an outer surface of the support plate 230.

According to an exemplary embodiment, a surface of the bending portion 212b may include one or more projections 215 formed thereon. The projection 215 may be formed at the part of the bending portion 212b contacting the outer surface of support plate 230. The outer surface of the support plate 230 may include one or more grooves 235 respectively corresponding to the one or more projections 215 on the bending portion 212b. For example, the projections 215 and the grooves 235 may be respectively provided at the parts at which the first and second coupling portions 212 and 232 are overlapped with each other, so that the first end plate 210 and the support plate 230 may be more firmly coupled to each other.

Figure 8:
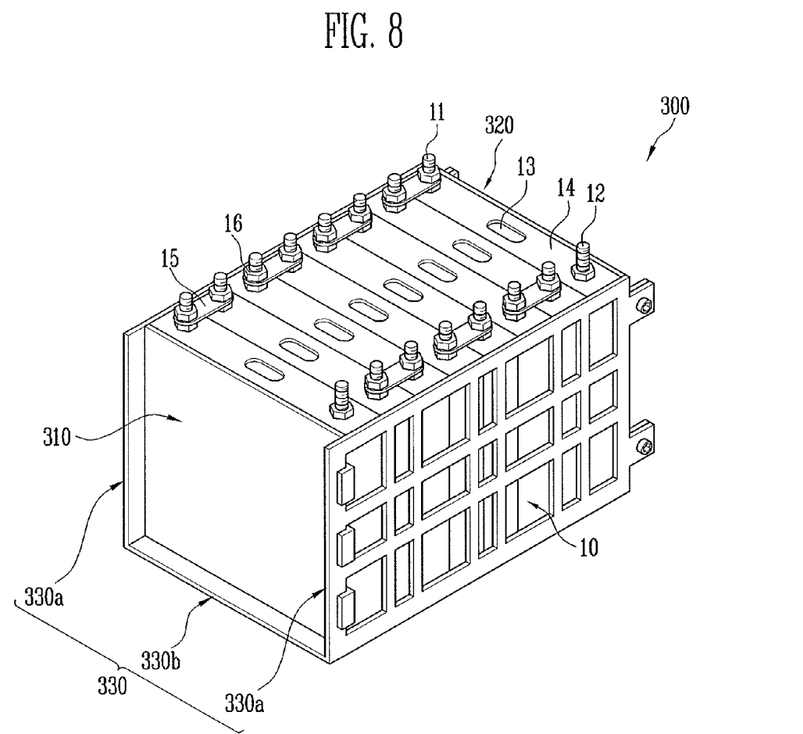
FIG. 8 illustrates a perspective view of a battery module according to an exemplary embodiment.
Figure 9:
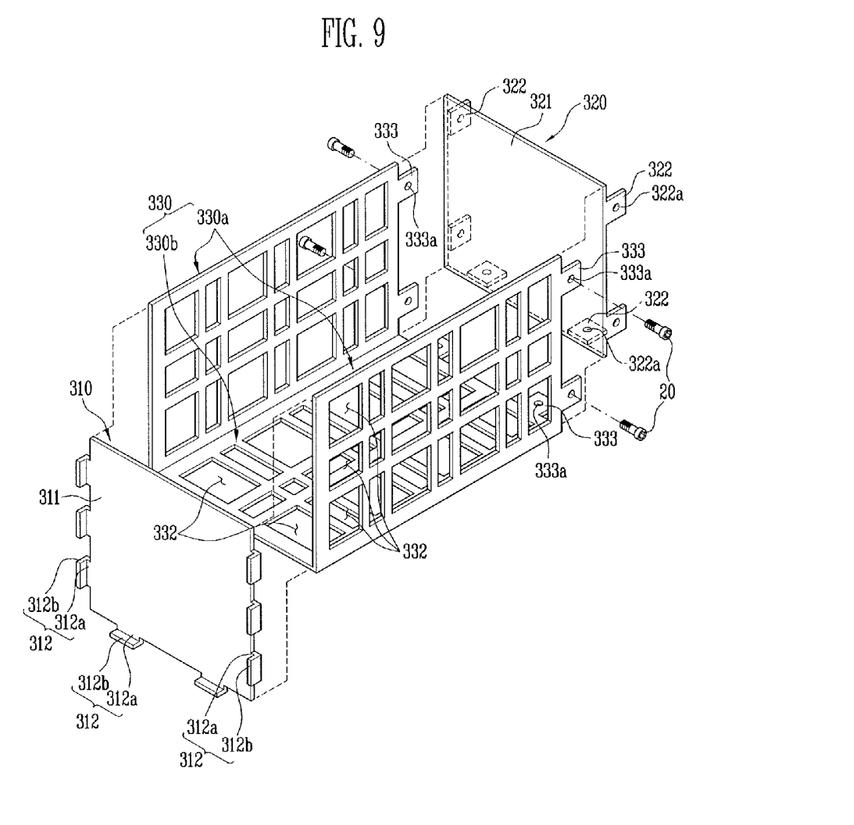
FIG. 9 illustrates a perspective view showing first and second end plates and a support plate of FIG. 8.

FIG. 8 illustrates a perspective view of a battery module according to another exemplary embodiment. FIG. 9 illustrates a perspective view showing first and second end plates 310 and 320 and a support plate 330 of FIG. 8. Contents of these embodiments, except the following content, are similar to those of the embodiment described in FIGS. 1 to 5, and therefore, repeated detailed descriptions will be omitted.

Referring to FIGS. 8 and 9, the battery module 300 according to this embodiment may include a plurality of battery cells 10, first and second end plates 310 and 320 fixing the battery cells 10, and a support plate 330. The first end plate 310 may be coupled to the support plate 330 without using any separate fastening member, e.g., the separate fastening member 20 is not used in the coupling of the first end plate 310 to the support plate 330. For example, ends of first and second plates 330a and 330b of the support plate 330 may include third coupling portions 332 respectively corresponding to first coupling portions 312 of the first end plate 310. The other ends of the first and second plates 330a and 330b may include fourth coupling portions 333 respectively corresponding to second coupling portions 322.

The support plate 330 may include a pair of the first plates 330a supporting side surfaces of the battery cells 10, and the second plate 330b supporting bottom surfaces of the battery cells 10. The first plates 330a may be integrally provided by being coupled to the second plate 330b, i.e., the first and second plates 330a and 330b may be integrally formed as one continuous piece in which the plurality of battery cells 10 may be seated therein. Alternatively, the first and second plates 330a and 330b may be assembled together, prior to having the plurality of battery cells 10 seated therein.

According to exemplary embodiments, the pair of first plates 330a may be provided to support opposing sides of the battery cells 10, and the pair of first plates 330a may be coupled to the second plate 330b. Accordingly, the section formed by the first and second plates 330a and 330b may be provided to have a 'U' shape.

The first end plate 310 may be fixed to one end of the support plate 330, e.g., by being coupled to each other by coupling the first coupling portion 312 of the first end plate 310 and the third coupling portion 332 in the support plate 330. Subsequently, the plurality of battery cells 10 may be arranged between the first end plate 310 and the support plate 330. The fourth coupling portion 333 may be coupled to the second coupling portion 322, so that the second end plate 320 can be coupled to the support plate 330.

The first and second end plates 310 and 320 may have the first and second coupling portions 312 and 322 provided at opposing sides and bottoms of the first and second base portions 311 and 321, respectively. The first and second coupling portions 312 and 322 may be coupled to the second plate 330b of the support plate 330, so that the battery module 300 may be more firmly fixed.

For example, the first end plate 310 may include a plurality of first coupling portions 312 arranged on at least three different sides of the first end plate 310. Each of the first coupling portions 312 may have a corresponding third coupling portion 332 in the support plate 330.

By way of summation and review, in a battery module, various types of members may be used to fix the alignment state of a plurality of battery cells, e.g., the members may include end plates and support plates that are affixed to each other. Embodiments include configurations between the end plates and support plates in which at least one separate fastening member may be omitted. Improved productivity, e.g., in forming a battery module, may be realized by facilitating coupling between the first and second end plates and the support plates. For example, a separate coupling member may be omitted, and thus it may be possible to reduce the possibility of and/or prevent a failure from occurring by omitting the process that entails the use of a separate fastening member. Embodiments also provide a battery module in which battery cells are firmly fixed so that the battery cells may not be moved by an external force.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells;
   a support plate adjacent to sides of the plurality of battery cells, the support plate including an opening; and
   a first end plate that is adjacent to the support plate, the first end plate including a projection that engages with the opening to couple together the first end plate and the support plate.

2. The battery module as claimed in claim 1, wherein the opening exposes at least one of the plurality of battery cells.

3. The battery module as claimed in claim 1, wherein the first end plate is affixed to the support plate with only an opening-projection connection between the opening and the projection.

4. The battery module as claimed in claim 3, wherein the opening-projection connection is free of any separate fastening member.

5. The battery module as claimed in claim 1, wherein the projection is a bent portion of the first end plate and a lateral end of the projection is in a non-overlapping relationship with the plurality of battery cells.

6. The battery module as claimed in claim 5, wherein the projection includes:
   an extending portion that extends through the opening, and
   a bending portion that is bent from the extending portion, the lateral end of the projection being on the bending portion.

7. The battery module as claimed in claim 6, wherein a length of the extending portion is substantially equal to a thickness of the support plate.

8. The battery module as claimed in claim 6, wherein the bending portion is adjacent to an outer surface of the support plate, and an inner surface of the support plate is adjacent to the sides of the plurality of battery cells.

9. The battery module as claimed in claim 8 wherein the bending portion includes a protrusion that corresponds to an indentation on the outer surface of the support plate.

10. The battery module as claimed in claim 1, further comprising a second end plate, wherein:
    the first end plate is adjacent to a first region of the support plate, and
    the second end plate is adjacent to a second region of the support plate, the second region opposing the first region.

11. The battery module as claimed in claim 10, wherein:
    the second end plate is fastened to the second region of the support plate, and
    the first end plate is affixed adjacent to the first region of the support plate without being fastened with any separate fastening member.

12. The battery module as claimed in claim 10, wherein the first end plate has a first configuration that includes the projection and the second end plate has a second configuration, the first configuration being different from the second configuration.

13. The battery module as claimed in claim 1, wherein:
    the opening includes a plurality of openings in the support plate, and
    the projection includes a plurality of projections, the plurality of projections being spaced apart from each other and being coupled to the plurality of openings.

14. The battery module as claimed in claim 13, wherein the plurality of openings in the support plate are spaced apart from each other, each opening receives one of the plurality of projections extending thereto, and the one of the plurality of projections is in contact with a sidewall of the opening.

15. The battery module as claimed in claim 1, wherein:
    the first end plate includes a base portion that is substantially parallel to wide faces of the plurality of battery cells,
    the projection is integrally formed as one continuous piece bent from the base portion, and
    the projection is seated on a first region of the support plate, the first region of the support plate being adjacent to the first end plate.

16. The battery module as claimed in claim 1, wherein:
    the support plate is one of a plurality of support plates arranged adjacent to different sides of the plurality of battery cells,
    the opening is one of a plurality of openings in the support plates, and
    the projection is one of a plurality of projections extending from a base portion of the first end plate, each projection extending through one of the openings.

17. The battery module as claimed in claim 16, wherein:
    inner surfaces of the plurality of support plates face the plurality of battery cells,
    the plurality of projections are seated on outer surfaces of the support plates, and
    the projections are in contact with sidewalls of the plurality of openings.

18. The battery module as claimed in claim 1, wherein the support plate is one of a plurality of support plates arranged adjacent to different sides of the plurality of battery cells, the plurality of support plates being one continuous piece.

19. The battery module as claimed in claim 18, wherein:
- the support plate includes a frame end portion, a first surface of the frame end portion being adjacent to the first end plate, and a second surface of the frame end portion opposes the first surface, and
- the projection is in contact with the second surface.

20. The battery module as claimed in claim 1, wherein:
- the support plate includes a frame end portion that defines an outermost side of the support plate and that defines a sidewall of the opening, the frame end portion is in a non-overlapping relationship with the plurality of battery cells, and
- the projection is in contact with the frame end portion and the sidewall of the opening.

\* \* \* \* \*

(12) EX PARTE REEXAMINATION CERTIFICATE (52nd)
Ex Parte Reexamination Ordered under 35 U.S.C. 257

United States Patent
Ahn (10) Number: US 8,512,889 C1
(45) Certificate Issued: Apr. 19, 2016

(54) BATTERY MODULE (75) Inventor: Jang-Gun Ahn, Yongin-si (KR)

(73) Assignee: ROBERT BOSCH GMBH

Supplemental Examination Request:
No. 96/000,098, Jun. 22, 2015

Reexamination Certificate for:
Patent No.: 8,512,889
Issued: Aug. 20, 2013
Appl. No.: 13/556,622
Filed: Jul. 24, 2012

Related U.S. Application Data (60) Provisional application No. 61/603,582, filed on Feb. 27, 2012.

(51) Int. Cl.
*H01M 2/10* (2006.01)
*H01M 10/04* (2006.01)

(52) U.S. Cl.
CPC ........ *H01M 2/1077* (2013.01); *H01M 10/0413* (2013.01); *H01M 10/0418* (2013.01); *H01M 2220/20* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,098, please refer to the USPTO's public Patent Application Information Retrieval (PAIR) system under the Display References tab.

*Primary Examiner* — Elizabeth McKane (57) ABSTRACT

A battery module includes a plurality of battery cells, a support plate adjacent to sides of the plurality of battery cells and the support plate includes an opening, and a first end plate that is adjacent to the support plate. The first end plate includes a projection that engages with the opening to couple together the first end plate and the support plate.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10 and 12 are cancelled.

Claims 1, 2, 6, 9, 11 and 15 are determined to be patentable as amended.

Claims 3-5, 7, 8, 13, 14 and 16-20, dependent on an amended claim, are determined to be patentable.

1. A battery module, comprising:
   a plurality of battery cells;
   a support plate adjacent to sides of the plurality of battery cells, the support plate including an opening; [and]
   a first end plate that is adjacent to the support plate, the first end plate including a projection that engages with the opening to couple together the first end plate and the support plate; *and*
   *a second end plate,*
   *wherein:*
   *the first end plate is adjacent to a first region of the support plate,*
   *the second end plate is adjacent to a second region of the support plate, the second region opposing the first region, and*
   *the first end plate has a first configuration that includes the projection and the second end plate has a second configuration, the first configuration being different from the second configuration.*

2. [The] *A* battery module [as claimed in claim 1], *comprising:*
   *a plurality of battery cells;*
   *a support plate adjacent to sides of the plurality of battery cells, the support plate including an opening; and*
   *a first end plate that is adjacent to the support plate, the first end plate including a projection that engages with the opening to couple together the first end plate and the support plate,*
   wherein the opening exposes at least one of the plurality of battery cells.

6. [The] *A* battery module [as claimed in claim 5], *comprising:*
   *a plurality of battery cells;*
   *a support plate adjacent to sides of the plurality of battery cells, the support plate including an opening; and*
   *a first end plate that is adjacent to the support plate, the first end plate including a projection that engages with the opening to couple together the first end plate and the support plate,*
   *wherein the projection is a bent portion of the first end plate and a lateral end of the projection is in a non-overlapping relationship with the plurality of battery cells, and*
   wherein the projection includes:
     an extending portion that extends through the opening, and
     a bending portion that is bent from the extending portion, the lateral end of the projection being on the bending portion.

9. The battery module as claimed in claim 8, wherein the bending portion includes a protrusion that corresponds to an indentation on the outer surface of the support plate.

11. The battery module as claimed in claim [10] *1*, wherein:
    the second end plate is fastened to the second region of the support plate, and
    the first end plate is affixed adjacent to the first region of the support plate without being fastened with any separate fastening member.

15. The battery module as claimed in claim 1, wherein:
    the first end plate includes a base portion that is substantially parallel to wide faces of the plurality of battery cells,
    the projection is integrally formed as one continuous piece bent from the base portion, and
    the projection is seated on [a] *the* first region of the support plate[, the first region of the support plate being adjacent to the first end plate].

* * * * *